(12) United States Patent
Fukada et al.

(10) Patent No.: US 9,467,913 B2
(45) Date of Patent: Oct. 11, 2016

(54) CAMERA IMAGE DISPLAY SYSTEM

(71) Applicant: Clarion Co., Ltd., Saitama (JP)

(72) Inventors: Akihiro Fukada, Saitama (JP); Nagatoshi Uehara, Saitama (JP); Shingo Kawaguchi, Kanagawa (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 14/775,453

(22) PCT Filed: Feb. 17, 2014

(86) PCT No.: PCT/JP2014/053634
§ 371 (c)(1),
(2) Date: Sep. 11, 2015

(87) PCT Pub. No.: WO2014/148173
PCT Pub. Date: Sep. 25, 2014

(65) Prior Publication Data
US 2016/0044558 A1     Feb. 11, 2016

(30) Foreign Application Priority Data

Mar. 19, 2013  (JP) ................................ 2013-056282

(51) Int. Cl.
*H04B 7/00*     (2006.01)
*H04W 36/06*    (2009.01)
(Continued)

(52) U.S. Cl.
CPC ............... *H04W 36/06* (2013.01); *G09G 5/00* (2013.01); *H04L 67/12* (2013.01); *H04N 5/23206* (2013.01); *H04N 5/23229* (2013.01); *H04N 7/181* (2013.01)

(58) Field of Classification Search
CPC ............... H04N 19/17; H04N 19/172; H04N 2007/145; H04N 21/41407

USPC ............... 455/509, 500, 517, 514, 515, 516, 455/550.1, 557, 556.1, 422.1, 418–420, 455/466, 426.1, 426.2; 348/14.01, 14.02
See application file for complete search history.

(56) References Cited

U.S. PATENT DOCUMENTS

2004/0100932 A1   5/2004   Shiota et al.
2006/0227215 A1  10/2006   Yamauchi
(Continued)

FOREIGN PATENT DOCUMENTS

AU   2003252195 A1   6/2004
CA   2 443 611 A1    5/2004
(Continued)

OTHER PUBLICATIONS

Extended European Search Report issued in corresponding EP Patent Application No. 14770823.4 dated Jul. 20, 2016.

*Primary Examiner* — Keith Ferguson
(74) *Attorney, Agent, or Firm* — Blank Rome LLP

(57) ABSTRACT

A camera image display system that can transmit and receive images captured by a camera while emphasizing real-time performance. The camera image display system includes an image dividing unit that divides an entire image captured by a camera into divided images, an encoder that converts the divided images into JPEG divided images respectively, and a wireless transmitter that transmits the JPEG divided images. By converting and transmitting the images by each divided image, the camera image display system can display the divided images, which are only parts of the entire image, on the screen when the divided images are transmitted and received satisfactorily. With this, it can improve the real-time performance to display the images on the display unit.

5 Claims, 11 Drawing Sheets

(51) Int. Cl.
*G09G 5/00* (2006.01)
*H04N 5/232* (2006.01)
*H04L 29/08* (2006.01)
*H04N 7/18* (2006.01)

(56) References Cited

U.S. PATENT DOCUMENTS

| | | | |
|---|---|---|---|
| 2008/0024592 A1* | 1/2008 | Bang | H04N 1/00307 348/14.02 |
| 2008/0125104 A1* | 5/2008 | You | G06F 3/1454 455/418 |
| 2012/0163226 A1 | 6/2012 | Tomizawa et al. | |

FOREIGN PATENT DOCUMENTS

| | | |
|---|---|---|
| CN | 1774882 A | 5/2006 |
| EP | 1 424 813 A2 | 6/2004 |
| EP | 1 628 486 A1 | 2/2006 |
| EP | 2 053 841 A1 | 4/2009 |
| JP | 2000-324474 A | 11/2000 |
| JP | 2003-333587 A | 11/2003 |
| JP | 2004-179826 A | 6/2004 |
| JP | 2008-193247 A | 8/2008 |
| KR | 20060013506 A | 2/2006 |
| TW | I227611 B | 2/2005 |
| WO | WO 2004/093375 A1 | 10/2004 |

* cited by examiner

CAMERA IMAGE DISPLAY SYSTEM

TECHNICAL FIELD

This invention is related to a camera image display system that displays images captured by a camera on a display unit installed in a vehicle by transmitting the image from a camera unit to the display wirelessly.

BACKGROUND ART

A technique that captures vehicle-peripheral images by using a vehicle-mounted camera and displays the captured images on a display unit installed in the vehicle has been known.

For example, a system includes a camera installed in the rear of a vehicle, captures images behind the vehicle by using the camera, and displays the captured images on a display installed inside the vehicle. With this, the driver of the vehicle can visually confirm blind spots from the images displayed on the display unit.

Also, a wireless image display system having a wireless transmitter so as to reduce wiring from a camera to a display unit has been taught by Japanese Laid-Open Patent No. 2003-333587.

Wireless communication is often disturbed and fails to transmit or receive signals when other signals are present in the same frequency band. Further, wireless communication may be delayed due to congestion of wireless signals.

However, images captured by a vehicle-mounted camera should be displayed on the display immediately (i.e., should be displayed on the display in real-time).

When the vehicle travels, the position of the vehicle changes, i.e., the vehicle-peripheral images captured by the vehicle-mounted camera also change in real-time.

Therefore, if the camera image display system does not display the vehicle-peripheral images on the display unit immediately after capturing, the camera image display system cannot provide useful information to the driver.

Here, the camera image display system is, for example, used to capture an image of a blind spot behind the vehicle and to display the captured image on the display unit installed inside the vehicle. With this, the camera image display system can assist reverse driving since the driver can visually confirm the blind spot by using the displayed image.

However, if the camera image display system cannot display the vehicle-peripheral image on the display unit immediately after capturing, i.e., if the image displayed on the display represents the image captured in the past, the reliability of the displayed image is low.

To overcome the above drawbacks, an object of this invention is to provide a camera image display system that can wirelessly transmit and receive images captured by the vehicle-mounted camera and display the image on the display unit while emphasizing real-time performance.

Solution to Problem

A camera image display system according to the present invention is configured to divide an entire image, which is captured by a camera, into a plurality of divided images, convert the divided images into JPEG format respectively, and transmit and receive the JPEG divided images. Accordingly, even if a transmission-and-reception of a JPEG divided image is failed or delayed, the camera image display system can display other JPEG divided images that are satisfactorily received on a display unit. Therefore, it can display the image on the display unit without delay caused by retransmission of the entire image.

Specifically, the camera image display system according to the present invention includes a camera unit that includes a camera, an image dividing unit generating divided images by dividing an entire image captured by the camera, an encoder respectively converting the divided images into JPEG divided images, and a wireless transmitter transmitting the JPEG divided images wirelessly; a wireless receiver that receives the JPEG divided images transmitted by the wireless transmitter; a display unit that displays images; a decoder that decodes the JPEG divided images received by the wireless receiver; and an image display controller that controls the display unit to respectively display the decoded divided images, which are divided by the image dividing part, at positions on the display unit corresponding to positions of the divided images in the entire image.

Advantageous Effects

With this the camera image display system according to the present invention can reliably transmit and receive image data acquired by capturing an image with the camera while emphasizing real-time performance.

DESCRIPTION OF EMBODIMENT

Hereinafter, a camera image display system according to the present invention will be explained with reference to the drawings.

[Structures]

Figure 1:
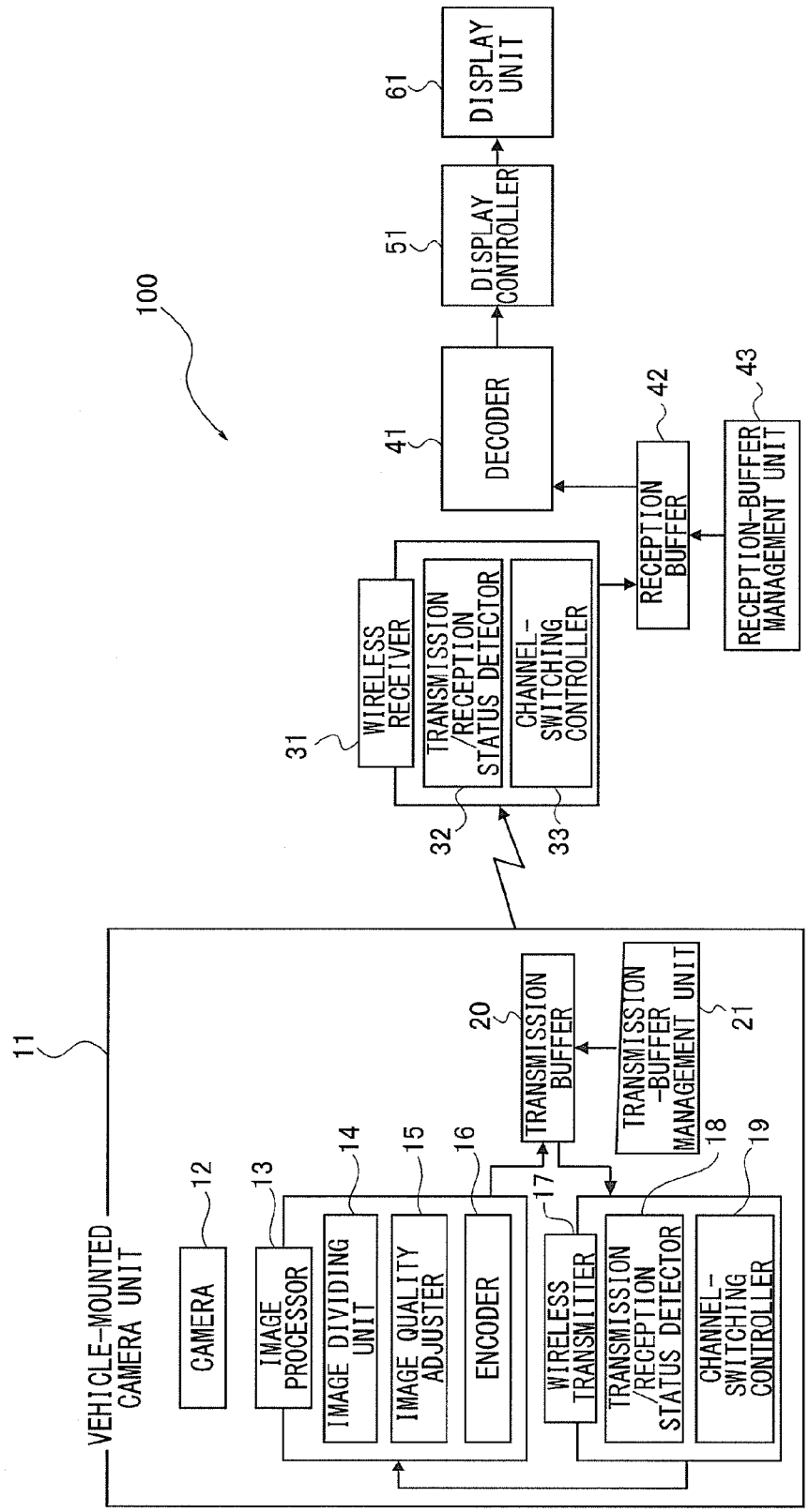
FIG. 1 is a block diagram illustrating an overall configuration of a camera image display system according to an embodiment of the present invention.

As illustrated in FIG. 1, a camera image display system 100 according to an embodiment (an example of the camera image display system of the present invention) includes a vehicle-mounted camera unit 11 (an example of an camera unit) installed in a vehicle (not illustrated), a wireless receiver 31, a decoder 41, a reception buffer 42, a reception-buffer management unit 43, a display controller 51, and a display unit 61.

The vehicle-mounted camera unit 11 integrally includes a camera 12, an image processor 13 that executes image processing on the images captured by the camera 12, a transmission buffer 20, a transmission-buffer management unit 21, and a wireless transmitter 17.

The image processor 13 includes an image dividing unit 14, an encoder 16, and an image quality adjuster 15. The image dividing unit 14 divides an entire image P (i.e., an image of one full screen (frame)) captured by the camera 12 (illustrated in FIG. 2) into, for instance, five divided images p1, p2, p3, p4, and p5 (illustrated in FIG. 3). The encoder 16 respectively converts the five divided images p1-p5 into JPEG divided images p1-p5. The image quality adjuster 15 adjusts image qualities of the divided images p1-p5 in accordance with a transmission-and-reception status detected by a transmission-and-reception status detector 18 (explained later) of the wireless transmitter 17.

(Channel Switching)

The wireless transmitter 17 transmits the JPEG divided images p1-p5 to the wireless receiver 31 and includes the transmission-and-reception status detector 18 and a channel-switching controller 19. The transmission-and-reception status detector 18 detects the transmission-and-reception status of the JPEG divided images p1-p5 between the wireless transmitter 17 and the wireless receiver 31. Based upon the transmission-and-reception status detected by the detector 18, the channel-switching controller 19 controls the wireless transmitter 17 to switch channels C in the wireless frequency band, which are used by the wireless transmitter 17 and the wireless receiver 31, in accordance with a predetermined condition.

The wireless receiver 31 receives the JPEG divided images p1-p5, which are transmitted from the wireless transmitter 17, and includes a transmission-and-reception status detector 32 and a channel-switching controller 33. The transmission-and-reception status detector 32 detects the transmission-and-reception status of the JPEG divided images p1-p5 between the wireless transmitter 17 and the wireless receiver 31. Based upon the transmission-and-reception status detected by the detector 32, the channel-switching controller 33 controls the wireless receiver 31 to switch channels C in the wireless frequency band, which are used by the wireless transmitter 17 and the wireless receiver 31, in accordance with the predetermined condition.

Here, the predetermined condition for switching the channel C by using the channel-switching controller 33 based on the transmission-and-reception status detected by the detector 32 is that, for example, the transmission-and-reception status is exceedingly poor (e.g., the wireless receiver 31 does not receive the JPEG divided images p1-p5 from the wireless transmitter 17 in a prescribed time period). Further, the predetermined condition for switching the channel C by using the channel-switching controller 19 based on the transmission-and-reception status detected by the detector 18 is that, for example, the wireless transmitter 17 does not receive a notice that the wireless receiver 31 has received the JPEG divided images p1-p5.

Here, the timing to switch the channel C of the wireless transmitter 17 by using the channel-switching controller 19 and the timing to switch the channel C of the wireless receiver 31 by using the channel-switching controller 33 are substantially identical to each other.

Further, the condition for switching the channel C by using the channel-switching controller 19 of the wireless transmitter 17 and the condition for switching the channel C by using the channel-switching controller 33 of the wireless receiver 31 are set to be identical to each other.

The camera image display system 100 according to the embodiment is exemplified such that the system 100 displays the images captured by the camera installed in the vehicle (i.e., the vehicle-mounted camera) on the display unit installed inside the same vehicle. However, it should not be limited to the camera image display system 100 having a vehicle-mounted camera. For example, a camera image display system may be configured to include a camera unit, which has the wireless transmitter 17 and is installed in a parking lot at home, wireless receiver 31, and display unit 61, which are installed in the vehicle; and to display the images captured by the camera unit on the display unit 61 of the vehicle, which is about to park. This kind of system is also an example of the camera image display system according to the present invention.

The camera image display system 100 of the embodiment may include three channels to be switched.

Specifically, when the wireless transmitter 17 and wireless receiver 31 comply with the standard of wireless LAN (e.g., IEEE 802.11b), the camera image display system 100 has three channels, channel 1 (1 ch), channel 6 (6ch), and channel 11 (11ch), and the frequency bands of the channels are different from each other. The channel-switching controllers 19, 33 then switch the channels C in the wireless frequency bands used by the wireless transmitter 17 and wireless receiver 31 between the channels 1, 6, and 11. Here, the channel C for the wireless transmitter 17 and the channel C for the wireless receiver 31 are correspondingly and sequentially switched.

Note that switching orders of the three channels (1 ch, 6ch, 11ch) for the wireless transmitter 17 and wireless receiver 31 need to be the same (i.e., 1ch→6ch→11ch→1ch or 1ch→11ch→6ch→1c).

In the embodiment, the channel-switching controllers 19, 33 define the switching orders of the channels C and initial values C0 (i.e., 1 ch, 6ch, or 11ch) of the channels C in accordance with a Media Access Control (MAC) address of the wireless transmitter 17.

To be specific, the initial values C0 of the channels C are defined by:

multiplying a remainder of dividing the least-significant byte by three (3) (here, the remainder is one of 0, 1, and 2) by five (5); and adding one (1) to the multiplication result.

Accordingly, when the remainder is 0, the arithmetic result becomes 1 (i.e., the initial value C0 of the channel C is defined to be the channel 1). When the remainder is 1, the arithmetic result becomes 6 (i.e., the initial value C0 of the channel C is defined to be the channel 6). When the remainder is 2, the arithmetic result becomes 11 (i.e., the initial value C0 of the channel C is defined to be the channel 11).

Further, the switching order of the channel C is defined in accordance with the least-significant byte of the MAC address of the wireless transmitter 17. When the least-significant byte of the MAC address is an even number, the switching order is defined to be the ascending order (i.e., 1ch→6ch→11ch→1ch). When the least-significant byte of the MAC address is an odd number, the switching order is defined to be the descending order (i.e., 1ch→11ch→6ch→1ch).

(Image Quality Adjustment)

The image quality adjuster 15 adjusts image qualities of the divided images p1-p5 based on the transmission-and-reception status detected by the transmission-and-reception detector 18 of the wireless transmitter 17. Here, the condition for adjusting the image qualities is, for example, decided based on the number of the frames of the entire image P that have been transmitted to the wireless receiver 31 from the wireless transmitter 17 in the prescribed time period. Note that the number of frames can be zero, i.e., none of the five divided images p1-p5 has been transmitted to the wireless receiver 31.

Specifically, when the number of frames that have been received by the wireless receiver 31 in one second (i.e., a frame rate [FPS]) is smaller than a predetermined number, it is detected that the transmission-and-reception rate is low. Accordingly, the image quality adjuster 15 decreases the image qualities of the divided images p1-p5 that are about to be transmitted to the wireless receiver 31, thereby reducing the time taken for transmitting and receiving the divided images p1-p5 between the wireless transmitter 17 and wireless receiver 31.

Note that the transmission-and-reception rate may become low, for example, when the data amount of the images captured by the camera 12 is large, or when the transmission of the image data is terminated for a random amount of time because the wireless transmitter 17 finds out that the frequency band in which the data is being transmitted is busy by executing the carrier-sense multiple-access.

When the transmission-and-reception rate starts increasing after decreasing the image qualities of the divided images p1-p5 (specifically, when the frame rate of the JPEG divided images p transmitted from the wireless transmitter 17 to the wireless receiver 31 becomes equal to or greater than the predetermined number), the image quality adjuster 15 increases the image qualities of the divided images p1-p5 transmitted from the wireless transmitter 17 to the wireless receiver 31. Note that the divided images p1-p5 may collectively be mentioned as the divided images p in this specification.

Here, the image qualities adjusted by the image quality adjuster 15 mean, for example, image resolutions of the divided images p1-p5 (i.e., the compression rate for encoding the divided images into JPEG format), sizes of the divided images p1-p5, or the frame rate of the divided images p1-p5.

Further, the image quality adjuster 15 may adjust or change the image qualities of the divided images p1-p5 to one of three qualities such as high image quality, intermediate image quality, and low image quality.

The high image quality may mean a high resolution (low compression rate for JPEG images), large image size (320 pixels in width and 240 pixels in height), and high frame rate (30 [FPS]).

The intermediate image quality may mean an intermediate resolution (intermediate compression rate for JPEG images), medium image size (256 pixels in width and 192 pixels in height), and intermediate frame rate (15 [FPS]).

The low image quality may mean a low resolution (high compression rate for JPEG images), small image size (192 pixels in width and 144 pixels in height), and low frame rate (10 [FPS]).

Figure 4:
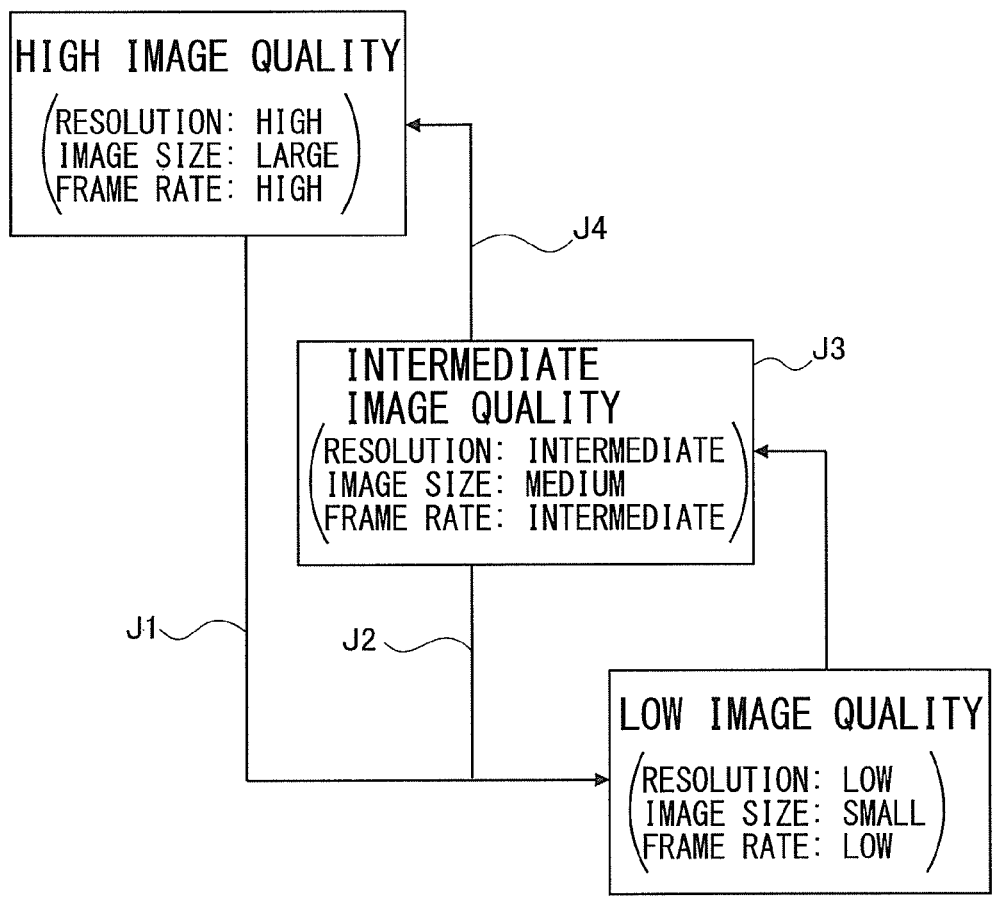
FIG. 4 is a transition diagram for explaining an example of switching image qualities.

As illustrated in FIG. 4, the image quality adjuster 15 adjusts or changes the image quality of each divided image from the high image quality to the low image quality when the transmission-and-reception status detected by the transmission-and-reception status detector 18 satisfies a condition J1 while transmitting and receiving the image with the high image quality. Further, the image quality adjuster 15 adjusts or changes the image quality of each divided image from the intermediate quality to the low image quality when the transmission-and-reception status detected by the transmission-and-reception status detector 18 satisfies a condition J2 while transmitting and receiving the image with the intermediate image quality.

Further, the image quality adjuster 15 adjusts the image quality of each divided image from the low image quality to the intermediate image quality when the transmission-and-reception status detected by the transmission-and-reception status detector 18 satisfies a condition J3 while transmitting and receiving the image with the low image quality. Further, the image quality adjuster 15 adjusts the image quality of each divided image from the intermediate quality to the high image quality when the transmission-and-reception status detected by the transmission-and-reception status detector 18 satisfies a condition J4 while transmitting and receiving the image with the intermediate image quality.

Here, the condition J1 is satisfied when the following situation (1) or (2) is satisfied:

(1) when the transmission-and-reception status detector 18 detects that the transmission-and-reception between the wireless transmitter 17 and wireless receiver 31 is terminated; or (2) when the frame rate of the transmission-and-reception between the wireless transmitter 17 and wireless receiver 31 is equal to or less than a high frame rate FH (30 [FPS]) by 2 [FPS] (i.e., equal to or less than 28 [FPS]) for two seconds or longer.

The condition J2 is met when the following situation (1) or (3) is satisfied:

(1) when the transmission-and-reception status detector 18 detects that the transmission-and-reception between the wireless transmitter 17 and wireless receiver 31 is terminated;

(3) when the frame rate of the transmission-and-reception between the wireless transmitter 17 and wireless receiver 31 is equal to or less than an intermediate frame rate FM (15 [FPS]) by 2 [FPS] (i.e., equal to or less than 13 [FPS]) for two seconds or longer.

The condition J4 is met when the following situation (4) is satisfied:

(4) when the frame rate of the transmission-and-reception between the wireless transmitter 17 and wireless receiver 31 is less than a low frame rate FL (10 [FPS]) but greater than 9 [FPS] for five seconds or longer, or when the frame rate is equal to or greater than the low frame rate FL for five seconds or longer.

The condition J5 is met when the following situation (5) is satisfied:

(5) when the frame rate of the transmission-and-reception between the wireless transmitter 17 and wireless receiver 31 is less than the intermediate frame rate FM (15 [FPS]) but greater than 14 [FPS] for five seconds or longer, or when the frame rate is equal to or greater than the intermediate frame rate FM for five seconds or longer.

Note that the above conditions J1 to J5 are only examples and should not be limited thereto. The conditions J1 to J5 may be defined based on other indexes applicable to determine the transmission-and-reception status.

Further, the parameters to define the image qualities should not be limited to the image resolutions (compression rate for JPEG images), image sizes (pixels in width and height), and frame rates. For example, the characteristics may be only one of or two of them.

Further, the characteristics to define the image qualities may include characteristics other than the image resolutions, image sizes (pixels in width and height), and frame rates.

The qualities that are switched by the image quality adjuster 15 may only be two qualities, higher image quality and lower image quality. In this case, the abovementioned intermediate image quality or low image quality may be omitted from the three qualities.

(Management of Transmission Buffer)

The transmission buffer 20 has a storage area capable of storing the JPEG divided images p1-p5, which are transmitted from the wireless transmitter 17, of at least two entire images P in chronological order.

The transmission buffer 20 of the embodiment is configured to have buffer areas m (m0, m1, . . . ) to store the divided images p1-p5 respectively. Hence, the transmission buffer 20 needs five buffer areas m (m1, m2, . . . , m4) for one entire image P.

Figure 5:
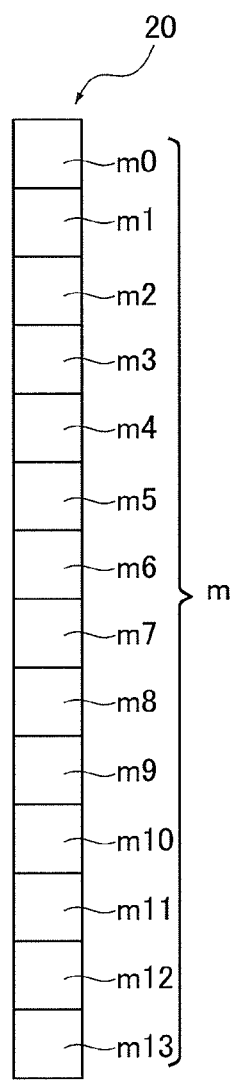
FIG. 5 is a schematic view conceptually illustrating a buffer area of a transmission buffer.

Here, the transmission buffer 20 has, for example, fourteen buffer areas m (m0, m1, . . . , m13) (i.e., five areas×two entire images+four extra areas), as illustrated in FIG. 5.

Note that the transmission buffer 20 of the embodiment uses one buffer area m for transmitting data and another one buffer area m for encoding.

Further, encoded data (divided images) are stored in the buffer area m and are set to be on standby for transmission. The standby data for transmission are then transmitted by the wireless transmitter 17 to the wireless receiver 31 in the standby order.

Figure 6:
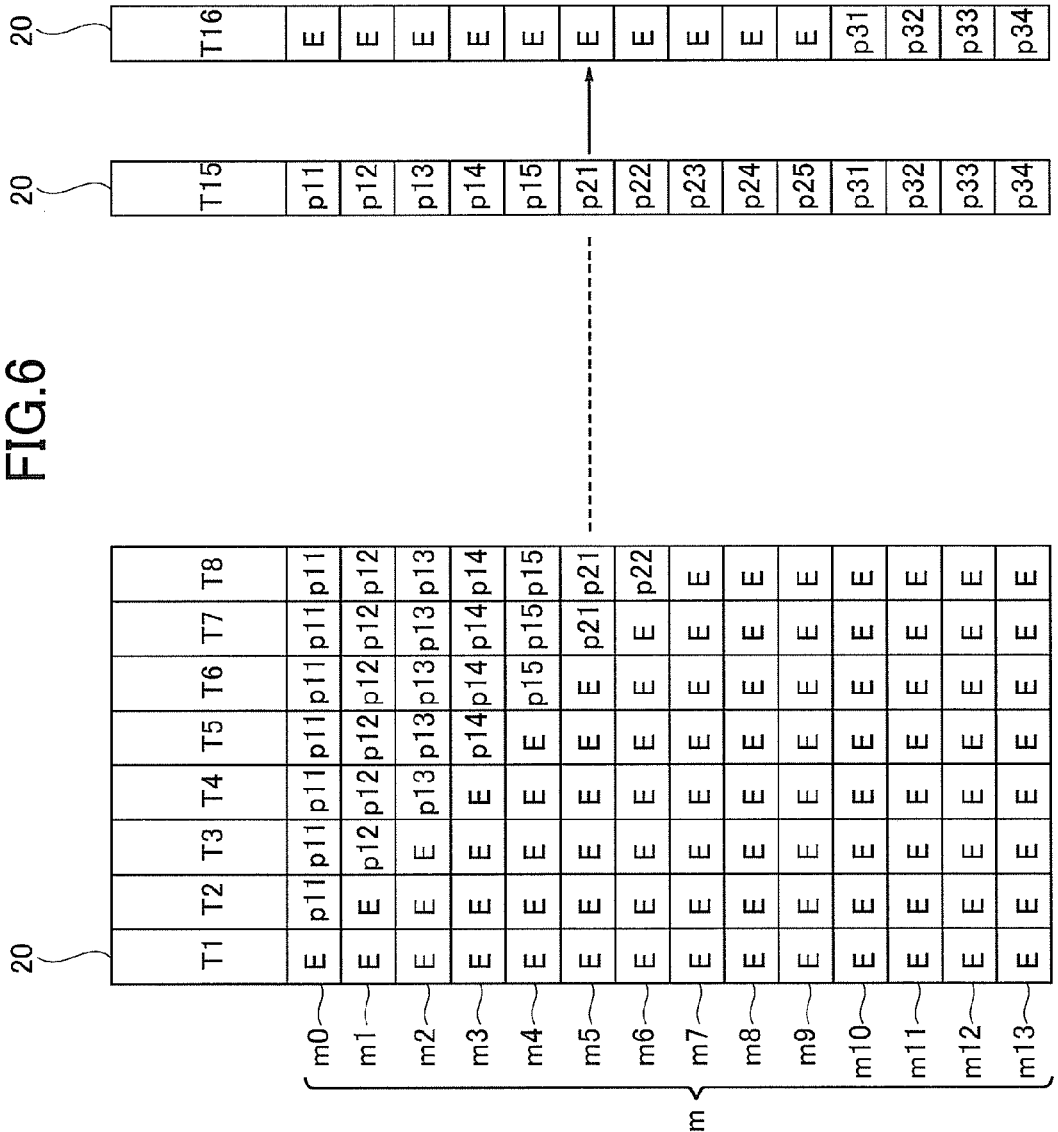
FIG. 6 is a schematic view illustrating a time-sequential change of a condition to store images in each buffer area.

As illustrated in FIG. 6, all the buffer areas m0-m13 are empty at first (at the time T1), and the first divided image p11 of the first entire image P1 is stored in the buffer area m0 as the data to be encoded by the encoder 16 at the next time T2.

Next, the second divided image p12 of the first entire image P1 is stored in the buffer area m1 as the data to be encoded, and the data representing the first divided image p11 that have been encoded is on standby for transmission in the buffer area m0 at the time T3.

The third divided image p13 of the first entire image P1 is then stored in the buffer area m2 as the data to be encoded, the data representing the second divided image p12 that have been encoded is on standby for transmission in the buffer area m1, and the data representing the first divided image p11 is transmitted by the wireless transmitter 17 from the buffer area m0 to the wireless receiver 31 at the time T4.

Accordingly, from the time T5 to T15, the fourth divided image p14 of the first entire image P1 is stored in the buffer area m3, the fifth divided image p15 of the first entire image P1 is stored in the buffer area m4, the first divided image p21 of the second entire image P2 is stored in the buffer area m5, the second divided image p22 of the second entire image P2 is stored in the buffer area m6, the third divided image p23 of the second entire image P2 is stored in the buffer area m7, the fourth divided image p24 of the second entire image P2 is stored in the buffer area m8, the fifth divided image p25 of the second entire image P2 is stored in the buffer area m9, the first divided image p31 of the third entire image P3 is stored in the buffer area m10, the second divided image p32 of the third entire image P3 is stored in the buffer area m11, the third divided image p33 of the third entire image P3 is stored in the buffer area m12, and the fourth divided image p34 of the third entire image P3 is stored in the buffer area m13.

Here, the data stored in the buffer area m is discarded by the transmission-buffer management unit 21 after being transmitted (i.e., the buffer area m becomes empty), and next data (for example, the fifth divided image p35 of the third entire image P3) is stored in the emptied buffer area m.

However, if the transmission of the data is slowed down or terminated due to a poor radio wave condition around the vehicle, the standby data stored in the buffer areas m are not transmitted to the wireless receiver 31 (i.e., no buffer area m is empty). Consequently, all the buffer areas m0-m13 of the transmission buffer 20 are filled with the data.

To avoid that, when the transmission-buffer management unit 21 detects that the transmission buffer 20 becomes full, the transmission-buffer management unit 21 manages the transmission buffer 20 to discard the divided images p11-p34 except for the divided images p31, p32, p33, and p34 of the latest entire image P3 (i.e., discards the divided images p11-p25 of the other entire images P) so as to empty the buffer areas m0-m9.

In other words, when a state incapable of transmitting the data lasts for a long time such that the transmission buffer 20 is filled with the standby data, the transmission-buffer management unit 21 keeps only the divided images p of the latest entire image P and discards the other divided images p to empty the corresponding buffer areas m.

Data representing the next divided images p35, p41, . . . will then be transmitted to the emptied buffer areas m0-m9.

Figure 7:
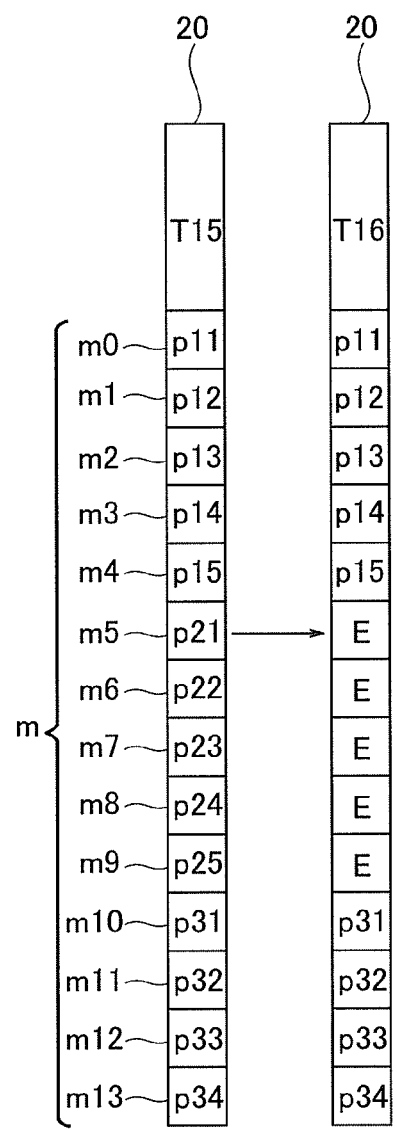
FIG. 7 is a schematic view illustrating a method for managing the transmission buffer while transmitting data.

Note that if the wireless transmitter 17 restarts transmitting a divided image p from the transmission buffer 20 when the buffer areas m of the transmission buffer 20 become full, the transmission-buffer management unit 21 does not discard the data of the entire image P1 that includes the currently-transmitted divided image p11 (i.e., the transmission-buffer management unit 21 keeps the data representing the divided images p11-p15 together with the data representing the divided images p31-p34 of the latest entire image P3) and discards the divided images p21-p25 of the remaining entire image P2 so as to empty the five buffer areas m for the divided images p1-p5 of another entire image P, as illustrated in FIG. 7.

(Management of Reception Buffer)

The reception buffer 42 and the reception-buffer management unit 43 provided with the wireless receiver 31 are similarly configured to the transmission buffer 20 and the transmission-buffer management unit 21.

Specifically, the reception buffer 42 has a storage area capable of storing the JPEG divided images p1-p5, which have been received by the wireless receiver 31, of at least two entire images P in chronological order.

Figure 8:
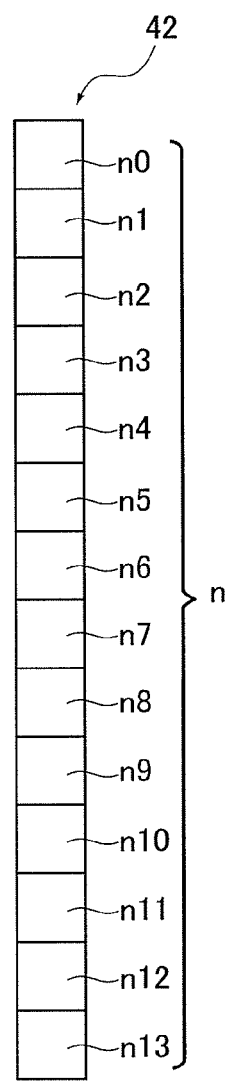
FIG. 8 is a schematic view conceptually illustrating a buffer area of a reception buffer.

The reception buffer 42 of the embodiment is configured to have buffer areas n (n0, n1, . . . ) to store the divided images p1-p5 respectively. Hence, the reception buffer 42 needs five buffer areas n (n0, n1, . . . , n4) for one entire image P Here, the reception buffer 42 has, for example, fourteen buffer areas n (n0, n1, . . . , n13) (i.e., five areas×two entire images+four extra areas), as illustrated in FIG. 8.

Note that the reception buffer 42 of the embodiment uses one buffer area n for receiving the data and another one buffer area n for decoding.

Further, the data, which are received by the wireless receiver 31, (i.e., the divided images) are stored in the buffer area n and are set to be on standby for decoding. The standby data for decoding are then decoded by the decoder 41 in the standby order.

Figure 9:
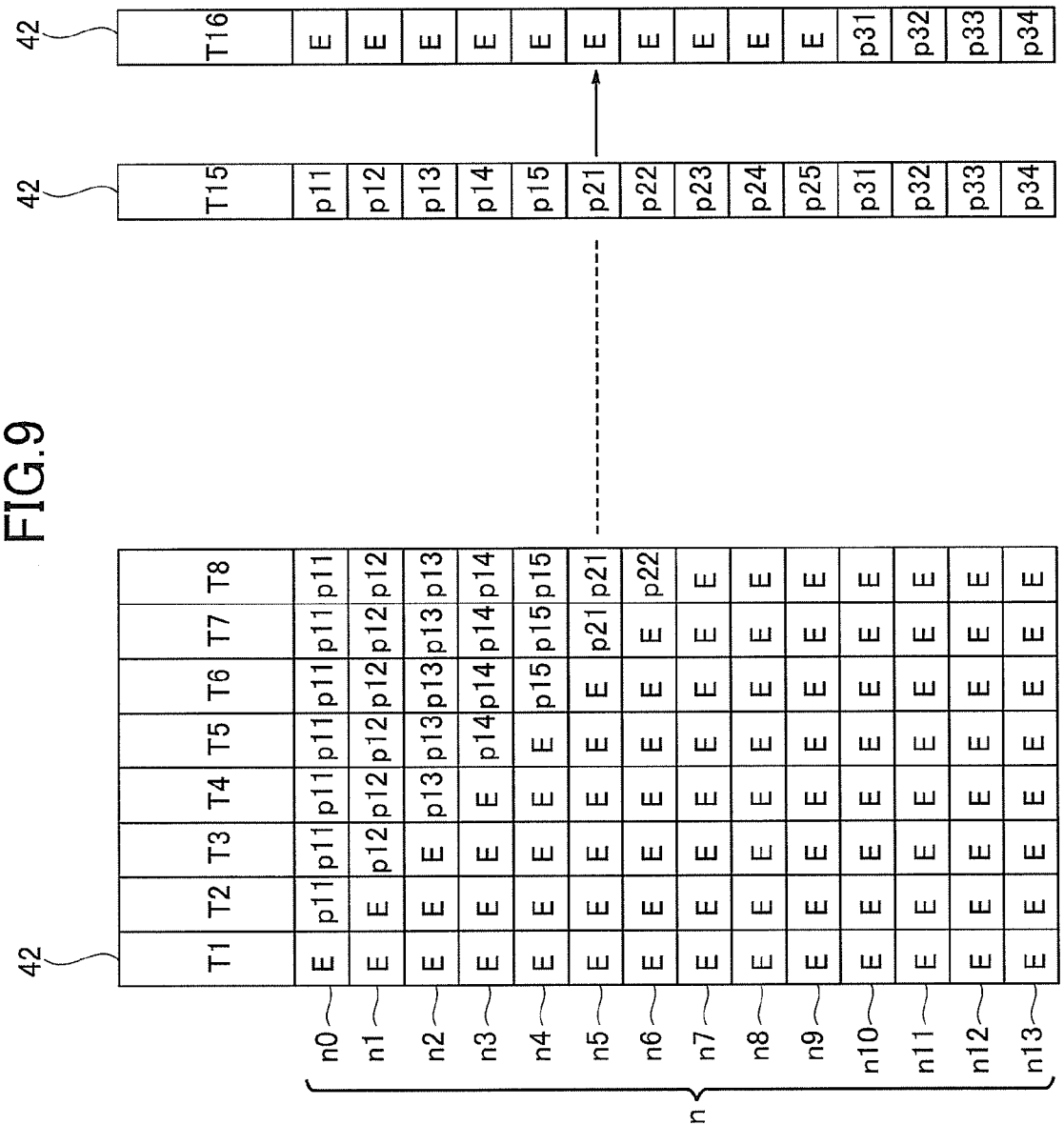
FIG. 9 is a schematic view illustrating a time-sequential change of a condition to store images in each buffer area.

As illustrated in FIG. 9, all the reception buffer areas n0-n13 are empty at first (at the time T1), and the first divided image p11 of the first entire image P1 is stored in the buffer area n0 as the received data at the next time T2.

Next, the second divided image p12 of the first entire image P1 is stored in the buffer area n1 as the received data, and the data representing the first divided image p11 is on standby for decoding in the buffer area n0 at the time T3.

The third divided image p13 of the first entire image P1 is then stored in the buffer area n2 as the received data, the data representing the second divided image p12 is on standby for decoding in the buffer area n1, and the data representing the first divided image p11 is decoded by the decoder 41 in the buffer area m0 at the time T4.

Accordingly, from the time T5 to T15, the fourth divided image p14 of the first entire image P1 is stored in the buffer area n3, the fifth divided image p15 of the first entire image P1 is stored in the buffer area n4, the first divided image p21 of the second entire image P2 is stored in the buffer area n5, the second divided image p22 of the second entire image P2 is stored in the buffer area n6, the third divided image p23 of the second entire image P2 is stored in the buffer area n7, the fourth divided image p24 of the second entire image P2 is stored in the buffer area n8, the fifth divided image p25 of the second entire image P2 is stored in the buffer area n9, the first divided image p31 of the third entire image P3 is stored in the buffer area n10, the second divided image p32 of the third entire image P3 is stored in the buffer area n11, the third divided image p33 of the third entire image P3 is stored in the buffer area n12, and the fourth divided image p34 of the third entire image P3 is stored in the buffer area n13.

Here, the data stored in the buffer area n is discarded by the reception-buffer management unit 43 after being decoded (i.e., the buffer area n becomes empty), and next data (for example, the fifth divided image p35 of the third entire image P3) is stored in the emptied buffer area.

However, if the data receiving speed of the wireless receiver 31 exceeds the decoding speed of the decoder 41 or if the decoding cycle of the decoder 41 is regulated by a display standard of the display unit 61, decoding the standby data stored in the buffer areas n is slowed down or terminated (i.e., no buffer area n is empty). Consequently, all the buffer areas n0-n13 of the reception buffer 42 are filled with the data.

To avoid that, when the reception-buffer management unit 43 detects that the reception buffer 42 becomes full, the reception-buffer management unit 43 manages the reception buffer 42 to discard the divided images p11-p34 except for the divided images p31, p32, p33, and p34 of the latest entire image P3 (i.e., discards the divided images p11-p25 of the other entire images P) so as to empty the buffer areas n0-n9.

In other words, when the reception buffer 42 is filled with the standby data, the reception-buffer management unit 43 keeps only the divided images p of the latest entire image P and discards the other divided images p to empty the buffer areas n.

Data representing the next divided images p35, p41, . . . will then be stored in the emptied buffer areas n0-n9.

Figure 10:
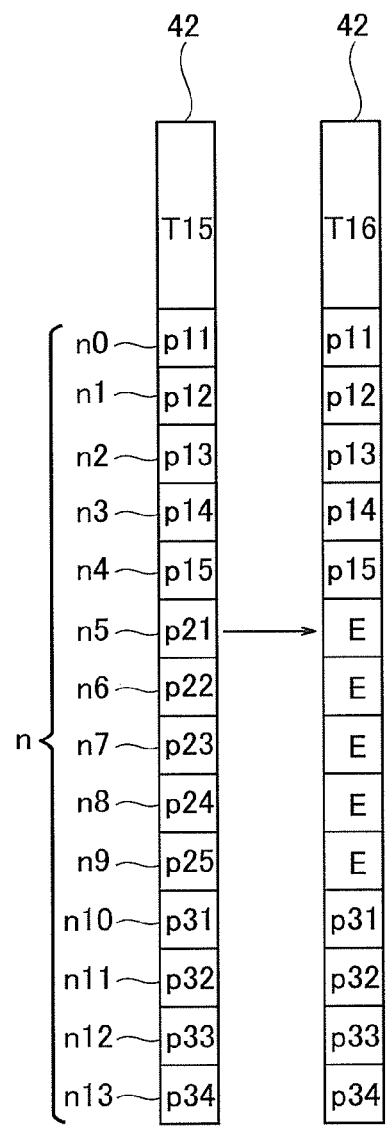
FIG. 10 is a schematic view illustrating a method for managing the reception buffer while decoding the data.

Note that if the decoder 41 restarts decoding a divided image p when the buffer areas n of the reception buffer 42 becomes full, the reception-buffer management unit 43 does not discard the data of the entire image P1 that includes the currently-decoded divided image p11 (i.e., the reception-buffer management unit 43 keeps the data representing the divided images p11-p15 together with the data representing the divided images p31-p34 of the latest entire image P3) and discards the divided images p21-p25 of the remaining entire image P2 so as to empty the five buffer areas n for the next divided images p1-p5 of the next entire image P, as illustrated in FIG. 10.

The decoder 41 decompresses the divided images p that has been compressed in JPEG format by the encoder 16.

The display unit 61 has a screen capable of displaying the entire image P on the entire screen. The display controller 51 controls the display unit 61 to display the divided images p, which have been decompressed by the decoder 41, at positions in the screen of the display unit 61 corresponding to the positions of the divided images p, which are divided by the image dividing unit 14, in the entire image P.

Figure 2:
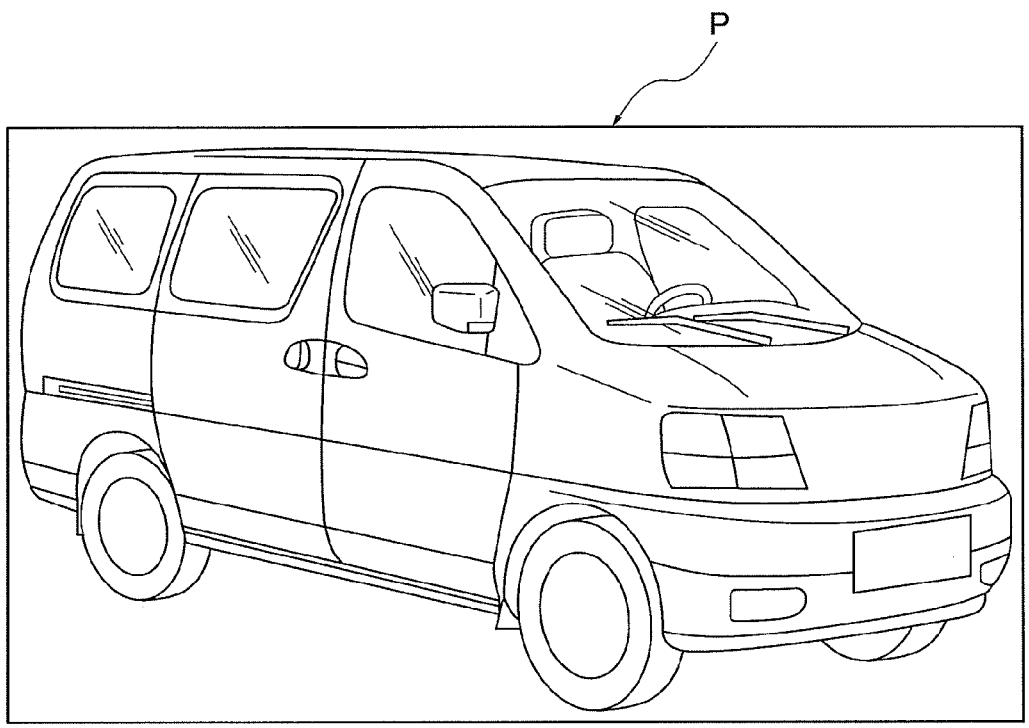
FIG. 2 is a schematic view illustrating an example of an entire image.
Figure 3:
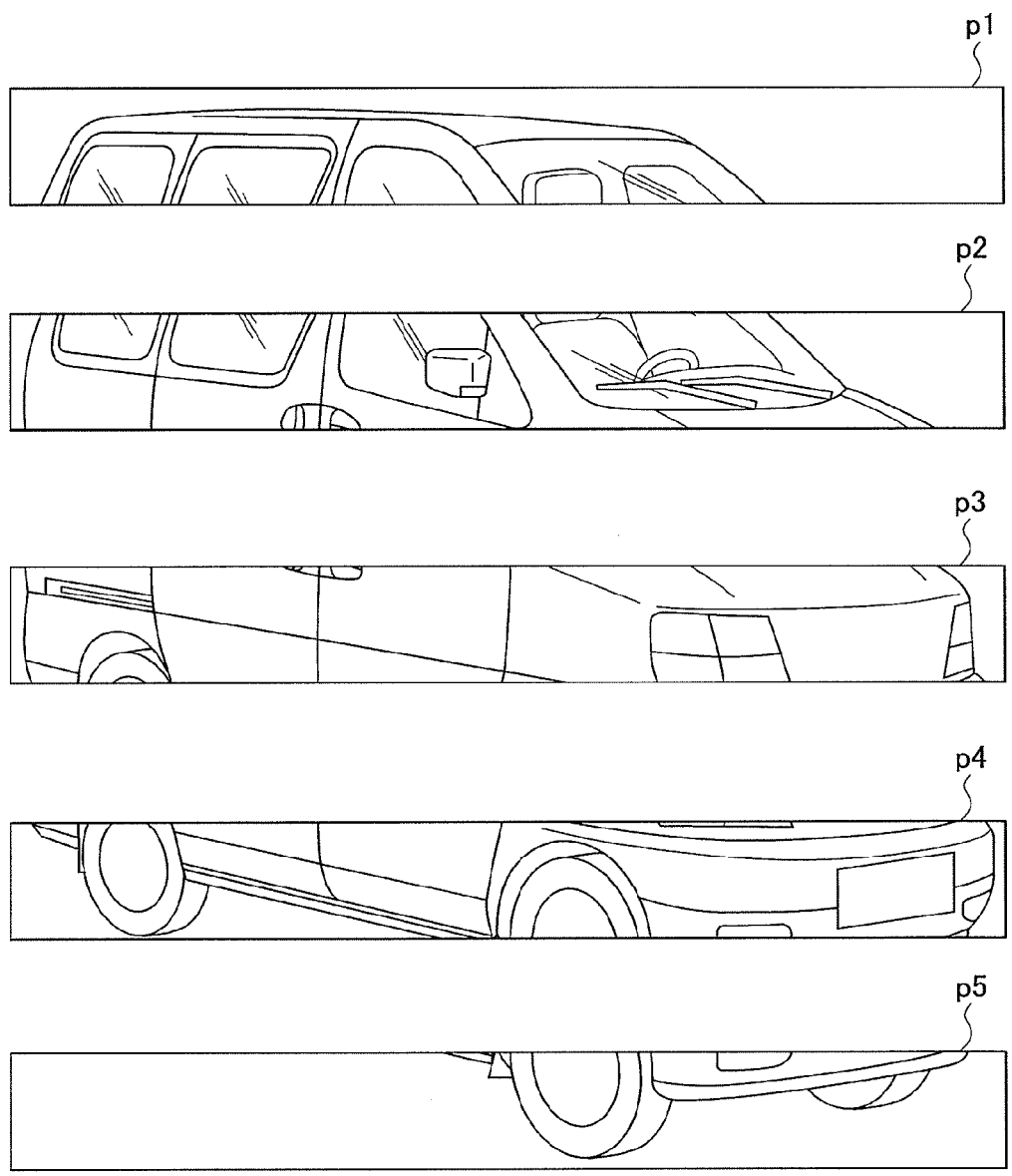
FIG. 3 is a schematic view illustrating an example of divided images.

To be specific, when the display unit 61 displays the entire image P illustrated in FIG. 2 on the entire screen, the display controller 51 controls the display unit 61 to display the divided image p1 showing the top part of the entire image P (illustrated in FIG. 3) at the top part on the screen.

Similarly, the display controller 51 controls the display unit 61 such that the divided image p2 showing the second top part of the entire image P is displayed at the second top part on the screen, the divided image p3 at the third top part on the screen, the divided image p4 at the fourth top part on the screen, and the fifth divided image p5 at the fifth top part (i.e., the bottom part) on the screen.

Further, the display controller 51 receives the first divided image p41 of the next entire image P4 when, for example, the previous entire image P3 (combination of the corresponding divided images p31-p35) is displayed on the screen of the display unit 61. The display controller 51 then decodes the first divided image p41 and displays it at the top part on the screen. At this moment, the other parts (second, third, fourth, and fifth top parts) on the screen show the divided images p32, p33, p34, and p35 of the previous entire image P3.

That is to say, the entire image displayed on the screen at this moment is a combined image of the divided images p41, p32, p33, p34, and p35. Accordingly, the entire images displayed on the screen may not represent the complete entire images P corresponding to the five divided images p1-p5, but mostly represent the images by partially combining the divided images p of different entire images.

(Action)

As explained above, the camera image display system 100 using the vehicle-mounted camera according to the embodiment is configured such that the camera 12 sequentially captures images (entire images) P1, P2, P3, P4, . . . at a predetermined interval.

The captured entire images P1, P2, . . . are then inputted to the image dividing unit 14 of the image processor 13 and divided into five divided images p11-p14, p21-p25, respectively.

Initially, the image qualities of the divided images p are high.

The divided images p are sequentially stored in the transmission buffer 20 and converted into JPEG format by the encoder 16 respectively. The encoded divided images p are then sequentially transmitted to the wireless receiver 31 by the wireless transmitter 17.

The divided images p received by the wireless receiver 31 are sequentially stored in the reception buffer 42. The divided images p stored in the reception buffer 42 are sequentially decompressed by the decoder 41, and the expanded divided images p are displayed at the corresponding parts on the screen of the display unit 61 by the display controller 51.

As mentioned, the camera image display system 100 of this embodiment is configured to convert the entire image P into JPEG format by each divided image p, instead of converting the entire image P into JPEG format at one time. Accordingly, even if a transmission-and-reception of a JPEG divided image p is failed or delayed, the camera image display system 100 can display other JPEG divided images p that are satisfactorily received by the wireless receiver 31 on the screen of the display unit 61. Therefore, it can display the image on the screen without delay caused by retransmission of the entire image P.

As is known, data in JPEG format cannot be decompressed and reconstructed as an image if the data lacks even one single byte.

The conventional system is configured to wirelessly transmit and receive data of an entire image in JPEG format. Therefore, the conventional system can reconstruct the image at the receiver side only when the whole data is completely transmitted and received. When the receiver cannot receive even one single byte of the data, the receiver requests the transmitter to retransmit the whole data of the entire image. Hence, the receiver needs to wait for the retransmission of the data of the entire image, and the image reconstructed by using the retransmitted data does not represent the current image. In other words, the system is not displaying the images in real-time.

In contrary, the camera image display system 100 of this embodiment is configured to convert the images into JPEG format by each divided image p. With this, the data amount of each divided image becomes smaller than that of an entire image, thereby reducing a probability of failure in transmitting and receiving the data.

Further, the camera image display system 100 of the embodiment is configured to display the divided images p that have normally been transmitted and received on the screen of the display unit 61. With this, it can greatly improve the real-time performance to display the images on the screen of the display unit 61, compared to the conventional technique.

Here, the image displayed on the screen of the display unit 61 is generated by partially overwriting the displayed image to a new divided image p, i.e., the image displayed on the screen is not generated from the divided images p of a single entire image P. Hence, the divided images p may not be combined or connected smoothly.

However, when the images captured by the vehicle-mounted camera unit 11 are displayed as a video in accordance with the NTSC standard, the user may not have uncomfortable feeling even if the divided images p are not smoothly combined. Rather than that, if displaying the image on the screen is delayed, the user will have uncomfortable feeling.

Since JPEG images are highly independent compared to MPEG images, it is easier to decode and encode the JPEG images, thereby reducing output time advantageously.

Further, the camera image display system 100 of the embodiment is configured to transmit and receive the divided images p between the wireless transmitter 17 and the wireless receiver 31. The transmission-buffer management unit 21 discards the divided images p of the old entire images P stored in the transmission buffer 20 when the transmission buffer 20 is filled with the data due to the delay of transmission of the data so as to store the divided images p of a new entire image P. With this, the system 100 can transmit the latest data as soon as the transmission status is back to normal.

Therefore, the system 100 can avoid transmitting the old data, which is stored in the transmission buffer 20 as the standby data for a while, to the wireless receiver 31. As a result, it can secure the real-time performance to display the images on the screen of the display unit 61 even if the transmission-and-reception status becomes poor.

Further, the reception-buffer management unit 43 executes the management similar to the transmission-buffer management unit 21 for the reception buffer 42 when the reception buffer 42 is filled with the data. Therefore, the system 100 can avoid outputting the old data to the decoder 41. As a result, the system 100 can secure the real-time performance to display the images on the screen of the display unit 61.

The camera image display system 100 of the embodiment is configured such that the transmission buffer 20 has fourteen buffer areas m. However, the number of the buffer areas m of the transmission buffer 20 should not be limited to fourteen. As long as the transmission buffer 20 can store the divided images of at least two entire images, any number of the buffer areas m should be applicable.

In this embodiment, the entire image P is divided into five divided images p, and the divided images p are stored in the corresponding buffer areas m respectively. Hence, the number of the buffer areas in necessary for storing two entire images P is 10.

Accordingly, the minimum number of the buffer areas m of the embodiment is 10. Note that if the entire image P is divided into three divided images, the minimum number of the buffer areas m is 6. If the entire image P is divided into ten divided images, the minimum number of the buffer areas m is 20.

Similarly, the number of the reception areas n of the reception buffer 42 should not be limited to fourteen. As long as the reception buffer 42 can store the divided images of at least two entire images, any number of the buffer areas n should be applicable.

Note that the number of the buffer areas m of the transmission buffer 20 and the number of the buffer areas n of the reception buffer 42 do not have to be the same. However, they are preferably defined to be the same for the data management.

Further, the camera image display system 100 of the embodiment is configured such that the image quality adjuster 15 decreases the image qualities of the divided images p to be transmitted from the high quality to the low quality so as to decrease the data amount to be transmitted and received between the wireless transmitter 17 and wireless receiver 31 when the transmission-and-reception status of the wireless transmitter 17 detected by the transmission-and-reception status detector 18 becomes poor. Accordingly, it can reduce the time required to transmit and receive the data.

By reducing the time required to transmit and receive the data, it can display the image on the screen of the display unit 61 without delay, i.e., it can secure the real-time performance to display the image on the screen.

Further, the image quality adjuster 15 increases the image qualities of the divided images p to be transmitted from the intermediate quality to the high quality or from the intermediate quality to the high quality when the transmission-and-reception status detected by the transmission-and-reception status detector 18 of the wireless transmitter 17 is recovered. With this, it becomes possible to improve the image quality of the image displayed on the display unit 61, thereby providing easily viewable images to the user.

Further, when the transmission-and-reception status detected by the transmission-and-reception status detector 18 is exceedingly poor due to a poor radio wave condition (e.g., when the detected transmission-and-reception status is less than the low frame rate (i.e., 10 [FPS]) even after the image quality adjuster 15 decreases the image qualities of the divided images p to the low quality); the channel-switching controllers 19, 33 control the wireless transmitter 17 and the wireless receiver 31 to switch the channel C in the wireless frequency band of the wireless transmitter 17 and wireless receiver 31 in accordance with the predetermined condition Accordingly, the system 100 can continue the transmitting and receiving the data with another channel C.

Hence, if the radio wave condition in the new channel C is satisfactory, the system 100 can transmit and receive the data between the wireless transmitter 17 and the wireless receiver 31 successfully, thereby securing the real-time performance.

Note if the radio wave condition in the new channel C is not satisfactory, the channel-switching controllers 19, 33 switch the channel C to another channel C.

Generally, at least one of the three channels C whose frequency bands do not overlap with others has a satisfactory transmission-and-reception status. Accordingly, by having three selectable channels C, the camera image display system 100 of the embodiment can secure a satisfactory transmission-and-reception status.

As explained above, the initial value C0 and the switching order of the channels C are defined in accordance with the least-significant byte of the MAC address of the wireless transmitter 17. However, when several vehicles having similar camera image display systems are present close to each other, the transmission-and-reception status between the wireless transmitter 17 and the wireless receiver 31 of each vehicle is affected by the wireless transmitters 17 and the wireless receivers 31 of the other vehicles. As a result, the transmission-and-reception status may become unsatisfactory.

When the initial values C0 of the channels C and the switching order of the channels C of the wireless transmitter 17 and the wireless receiver 31 of each vehicle are the same; having the channel-switching controllers 19, 33 of each vehicle switch the channels C substantially at the same time may not improve the transmission-and-reception status.

However, the camera image display system 100 of the embodiment is configured such that the initial values C0 of the channels C of the wireless transmitter 17 and the wireless receiver 31 and distributed to three values in accordance with the MAC address, and the switching orders of the channels C are distributed to two orders. Therefore, it can greatly reduce the possibility of having several vehicles equipped with the camera image display system 100 using the same initial values C0 and the same switching order in the vicinity of the subject vehicle.

Accordingly, it becomes effective to switch the channels C even when several vehicles equipped with the camera image display system of the embodiment are present close to each other.

The camera image display system 100 of the embodiment is configured such that the channel-switching controller 19 of the wireless transmitter 17 and the channel-switching controller 33 of the wireless receiver 31 individually and independently switch the corresponding channels C.

The switching timing of the channels C on the transmitter side and the switching timing of the channels C on the receiver side are defined in advance to be almost the same, but they may not completely be the same.

Therefore, the camera image display system 100 of the embodiment may be configured such that one of the channel-switching controllers 19, 33 sends a command for switching the channels C to the other side, thereby switching the channels C on the transmitter side and the receiver side at the same time.

Preferably, the channel-switching controller 33 on the receiver side sends the command for switching the channel C to the channel-switching controller 19 on the transmitter side.

However, the channel-switching controllers 19, 33 of the embodiment individually and independently switch the channels C based on the predetermined condition, as explained above. Accordingly, the channel-switching controllers 19, 33 can switch the channels C substantially at the same time even when the transmission-and-reception status is exceedingly poor and the command for switching the channels C cannot be sent to the other side.

The camera image display system 100 of the embodiment is prepared to have three channels C. However, the number of the channels C of the camera image display system of the present invention should not be limited to three. For example, the number may be two, four, or more.

Note that if the number of the channels is two, the switching order of the channels C is limited to a single order. Hence, it is preferable to have three or more channels C.

Also, when the camera image display system 100 has more than four channels C and uses the radio wave that is standardized with IEEE 802.11b, some of the channels C unavoidably overlap with other channels in some frequency bands. Therefore, to avoid the overlaps of the frequency bands, the number of the channels is preferred to be three.

When the camera image display system 100 has three channels C, the combinations of the channels C should not be limited to channels 1, 6, and 11. For example, the channels C may be channels 2, 7, and 12, channels 3, 8, and 13, or the like.

However, in the IEEE 802.11b standard, channels 1 to channels 11 are commonly used. Therefore, to use the camera image display system 100 worldwide, it is preferable to use the channels 1, 6, and 11.

In the camera image display system 100 of the embodiment, the wireless transmitter 17, transmission buffer 20, and transmission-buffer management unit 21 on the transmitter side together with the camera 12 and image processor 13 integrally configure the vehicle-mounted camera unit 11. However, in the camera image display system of the invention, the wireless transmitter 17, transmission buffer 20, and transmission-buffer management unit 21; and the camera 12 and image processor 13 may be separated from the wireless transmitter 17 and the like.

On the other hand, a part or all of the wireless receiver 31, reception buffer 42, reception-buffer management unit 43, decoder 41, image display controller 51, and display unit 61 on the receiver side may be integrally configured.

(Variation)

The camera image display system 100 using the vehicle-mounted camera according to the above embodiment switches the channels C in the frequency band used for transmitting and receiving the data in accordance with the transmission-and-reception status between the wireless transmitter 17 and the wireless receiver 31. However, if a specific are in a poor radio wave condition (transmission-and-reception status) is known (hereinafter, the area is simply called "specific area") and the vehicle equipped with the camera image display system 100 can detect the specific area, the channel-switching controllers 19, 33 may switch the channels C of the wireless transmitter 17 and the wireless receiver 31 to another channel C regardless of the transmission-and-reception status detected by the transmission-and-reception status detectors 18, 32.

An image display system 200 of the variation using a vehicle-mounted camera is configured such that the channel C of the switching destination (e.g., channel 6) is correspondingly prepared with the specific area (point) in, for instance, a look-up table.

Figure 11:
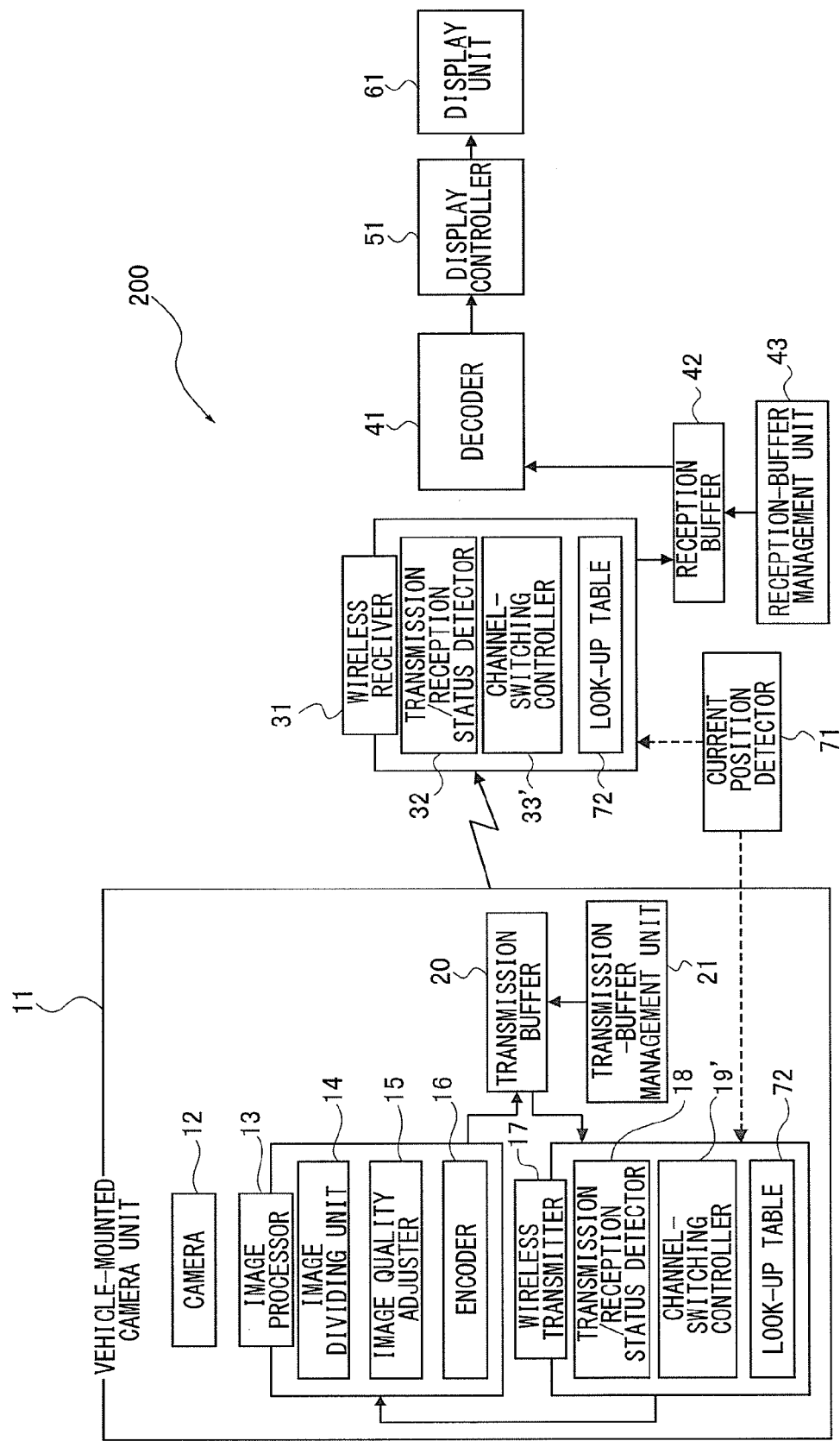
FIG. 11 is a block diagram illustrating an overall configuration of a variation of the camera image display system of FIG. 1.

As illustrated in FIG. 11, the camera image display system 200 is configured to include a current position detector 71 and the abovementioned look-up tables 72, 73 in addition to the configurations of the camera image display system 100 illustrated in FIG. 1. The camera image display system 200 is further configured such that the wireless transmitter 17 and the wireless receiver 31 respectively determine whether the current vehicle position detected by the current position detector 71 is within the specific area, in which the channel-switching controllers 19', 33' need to switch the channels C, by referring the corresponding look-up tables 72, 72. When both the wireless transmitter 17 and the wireless receiver 31 determine that the current vehicle position is within the specific area to switch the channels C, the channel-switching controllers 19', 33' switch the channels C to be used by the wireless transmitter 17 and the wireless receiver 31 to the channels C that are prepared in the look-up tables 72.

The current position detector 71 may be a global positioning system (GPS) used in a car navigation system that is commonly mounted on a vehicle in these days.

The camera image display system 200 is configured to include the look-up table 72 on each of the transmitter side and the receiver side. The channel-switching controller 19 on the transmitter side determines whether the vehicle is currently within the specific area by referring the look-up table on the transmitter side. The channel-switching controller 33 on the receiver side determines whether the vehicle is currently within the specific area by referring the look-up table on the receiver side. However, the camera image display system 200 may be configured such that one of the controllers 19, 33 on the transmitter side and the receiver side makes the determination and sends the determination result to the other channel-switching controller. Accordingly, the channel-switching controller 19 can switch the channel C of the wireless transmitter 17 and the channel-switching controller 33 can switch the channel C of the wireless receiver 31.

As explained, the camera image display system 200 can switch the channels C to the channels C in which the radio wave condition is satisfactory without detecting the actual transmission-and-reception status when the specific areas in which the radio wave condition is poor are known beforehand. With this, it becomes possible to simplify the process.

For example, if the camera image display system 200 is installed in a delivery vehicle that repeatedly travels a specific route including an area where the radio wave condition is poor, the channel-switching controllers 19, 33 can always switch the channels C to the channels C in which the radio wave condition is satisfactory. With this, it is possible to suppress dispersion of the radio wave condition.

Note that the look-up table 72 may be rewritable and include additional parameters in accordance with the demand of the user.

Note that the other configurations of the camera image display system 200 of the variation are identical to those of the camera image display system 100 illustrated in FIG. 1. However, the camera image display system 200 may be configured to switch the channels C based on the correspondence prepared in the look-up tables 72 and to adjust the image qualities (increase and decrease the frame rates of the divided images p) by using the image quality adjuster 15.

Note that the camera image display system 200 of the variation may display the images captured by the camera installed in the vehicle (i.e., the vehicle-mounted camera) on the display unit installed inside the same vehicle. However, as explained with the embodiment illustrated in FIG. 1, the variation may include a camera unit, which has the wireless transmitter 17 and is installed in a parking lot at home, wireless receiver 31, and display unit 61, which are installed in the vehicle. Further, the variation may display the images captured by the camera unit on the display unit 61 of the vehicle, which is about to park. This kind of system is also an example of the camera image display system according to the present invention.

CROSS-REFERENCE TO RELATED APPLICATION

The present application is based on and claims priority from Japanese Patent Application No. 2013-56282, filed Mar. 19, 2013, the disclosure of which is hereby incorporated by reference in its entirety.

The invention claimed is:

1. A camera image display system, comprising:
a camera unit that includes a camera, an image dividing unit generating divided images by dividing an entire image captured by the camera, an encoder respectively converting the divided images into JPEG divided images, and a wireless transmitter transmitting the JPEG divided images wirelessly;
a wireless receiver that receives the JPEG divided images transmitted by the wireless transmitter;
a display unit that displays images;
a decoder that decodes the JPEG divided images received by the wireless receiver;
an image display controller that controls the display unit to respectively display the decoded divided images at positions on the display unit corresponding to positions of the divided images in the entire image;
a transmission-and-reception status detector that detects a transmission-and-reception status of the JPEG divided images between the wireless transmitter and the wireless receiver; and
a channel-switching controller that has at least three channels in the wireless frequency band, controls the wireless transmitter and the wireless receiver to sequentially switch the at least three channels based on the detected transmission-and-reception status, and changes a switching order of the at least three channels in accordance with a MAC address of the wireless transmitter.

2. The camera image display system as claimed in claim 1, further including: an image quality adjuster that adjusts at least one of an image size of the JPEG divided images, a compression rate for encoding the divided images into JPEG format, and a frame rate based on the detected transmission-and-reception status.

3. The camera image display system as claimed in claim 1, further including: a transmission buffer that has a storage area capable of storing the JPEG divided images of at least two entire images transmitted by the wireless transmitter in chronological order; and a transmission-buffer management unit that manages the transmission buffer to discard the divided images stored in the storage area of the transmission buffer except for the divided images corresponding to the latest entire image when the storage area of the transmission buffer becomes full.

4. The camera image display system as claimed in claim 1, further including: a reception buffer that has a storage area capable of storing the JPEG divided images of at least two entire images to be decoded by the decoder in chronological order; and a reception-buffer management unit that manages the reception buffer to discard the divided images stored in the storage area of the reception buffer except for the divided images corresponding to the latest entire image when the storage area of the reception buffer becomes full.

5. The camera image display system as claimed in claim 1, further including: a current position detector that detects a current position of the vehicle having the wireless receiver; and a channel-switching controller that respectively controls the wireless transmitter and the wireless receiver to switch channels in a wireless frequency band used by the wireless transmitter and the wireless receiver in accordance with the detected current vehicle position.

* * * * *